May 6, 1924.　　　　　F. A. KREHBIEL　　　　　1,492,927
CAR LOADING APPARATUS
Filed Dec. 18, 1920　　　3 Sheets-Sheet 1
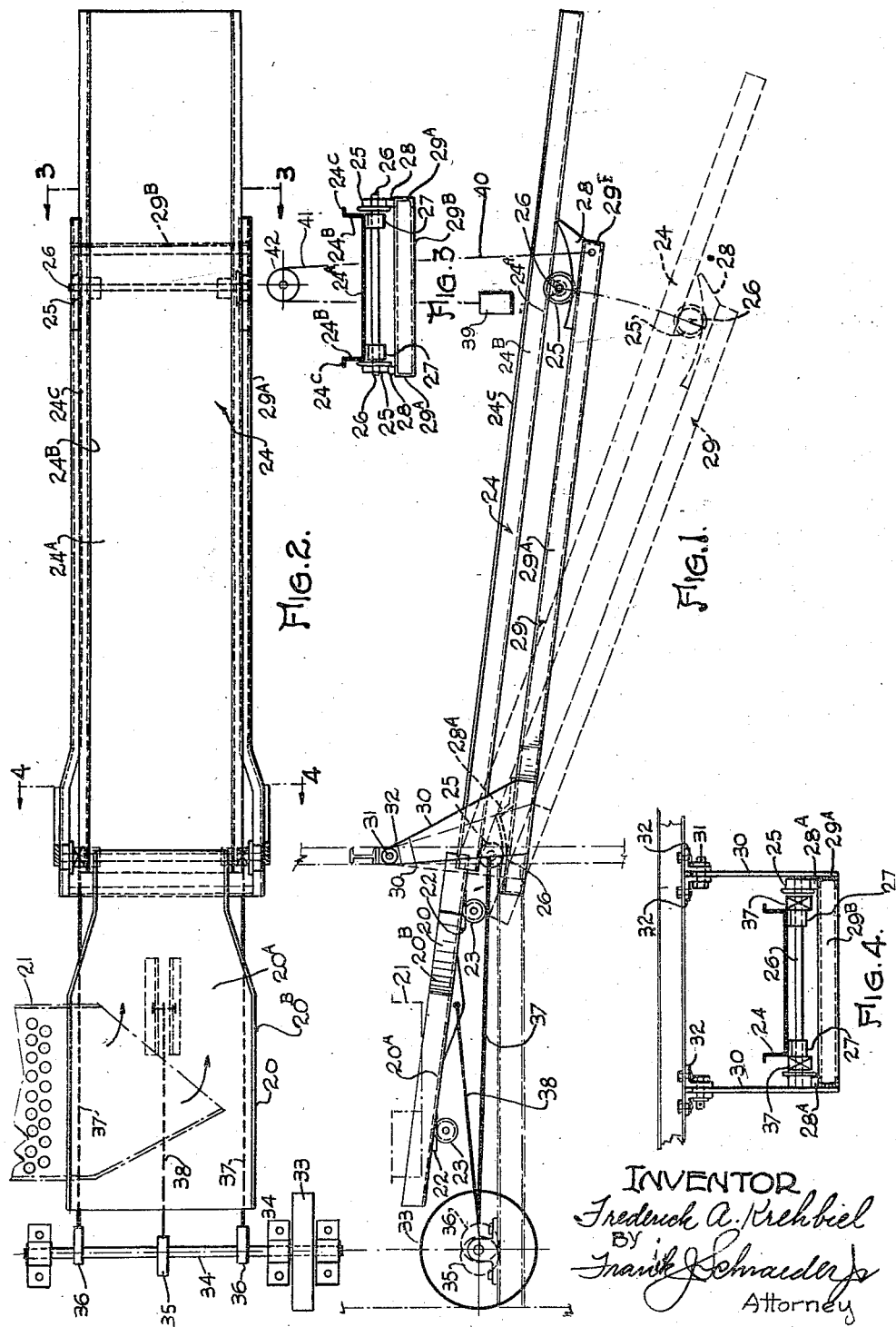

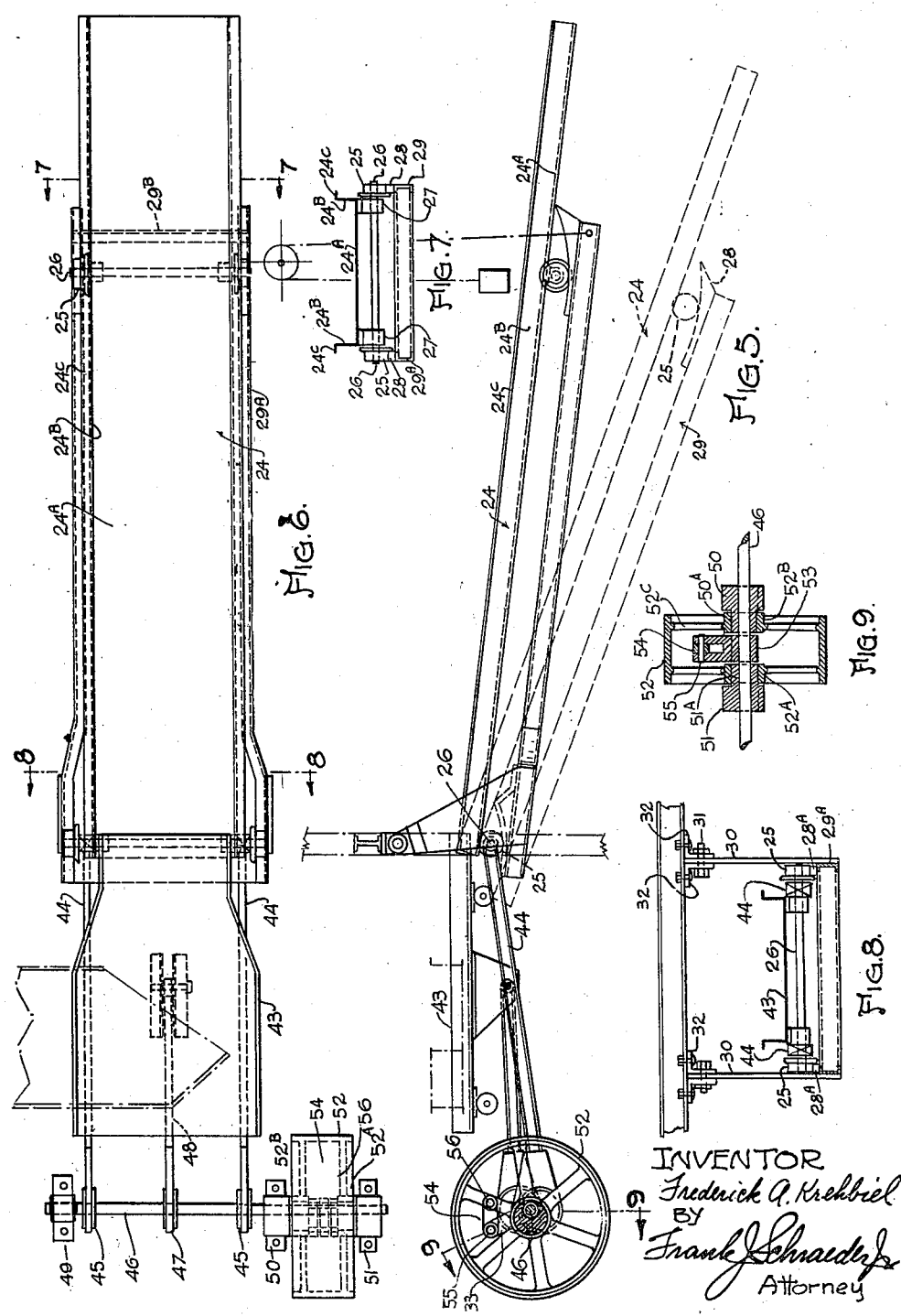

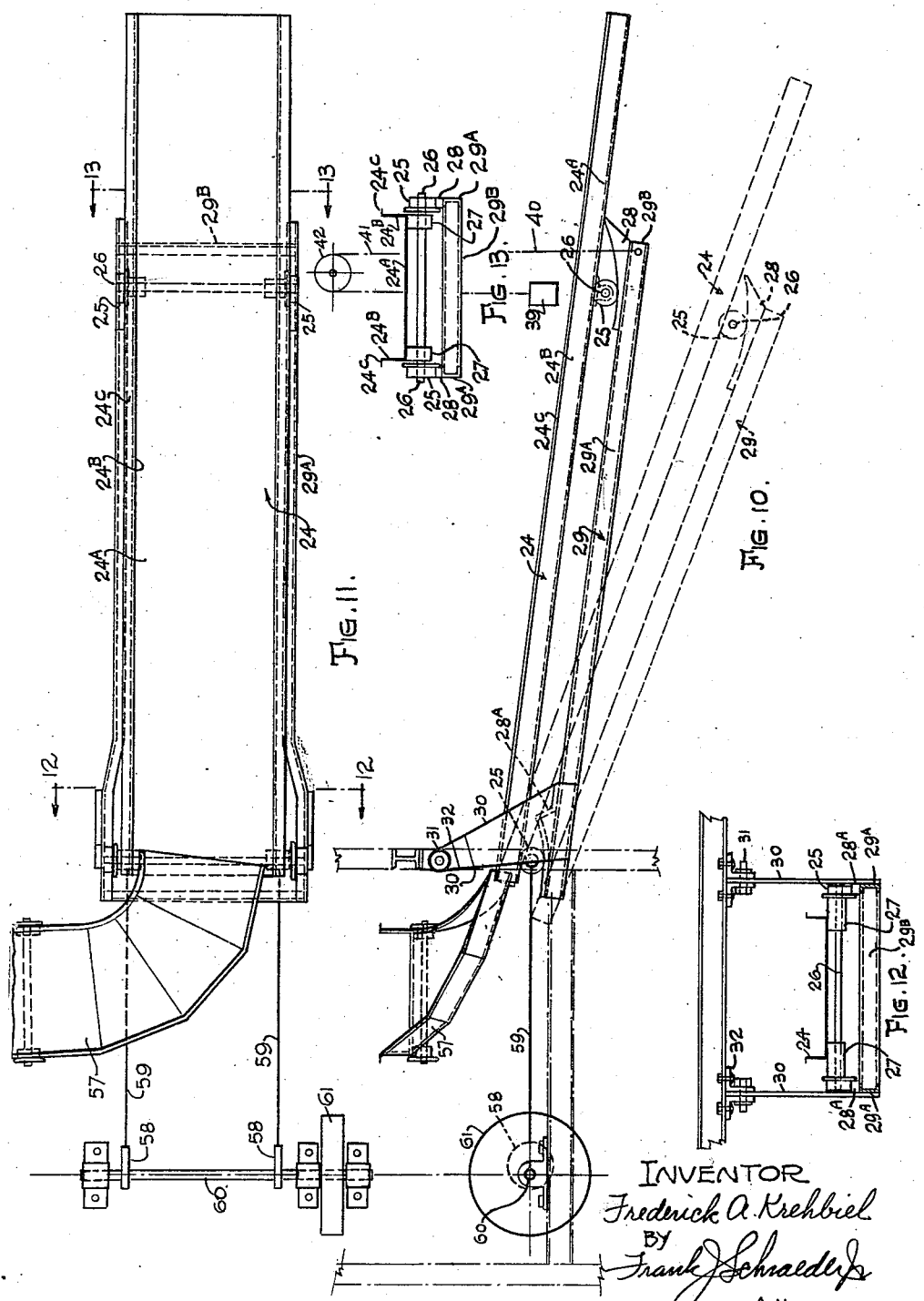

Patented May 6, 1924.

1,492,927

UNITED STATES PATENT OFFICE.

FREDERICK A. KREHBIEL, OF HINSDALE, ILLINOIS, ASSIGNOR TO KREHBIEL COMPANY, OF CHICAGO, ILLINOIS, A CORPORATION OF ILLINOIS.

CAR-LOADING APPARATUS.

Application filed December 18, 1920. Serial No. 431,560.

*To all whom it may concern:*

Be it known that I, FREDERICK A. KREHBIEL, a citizen of the United States, residing at Hinsdale, in the county of Du Page and State of Illinois, have invented a new and useful Improvement in Car-Loading Apparatus, of which the following is a specification.

This invention relates generally to improvements in conveying and loading apparatus. An object of this invention is to provide means for conveying and gradually loading granular materials from a higher level to a lower with a minimum of breakage.

It is also an object to provide an apparatus of this character with a perpendicularly adjustable inclined discharge or loading chute operating in combination with a horizontal or slightly inclined receiving chute.

It is also an object of my invention to provide a loading apparatus which will permit the inspection and hand-picking of the larger coal to remove refuse preliminary to loading and to this end I provide a horizontally disposed reciprocating receiving chute or picking table upon which the coal can be hand picked and which picking table will be operative to advance the coal forwardly while the inclined loading chute which carefully lowers the coal into the car, will be operated with a slightly retarding motion but due to the inclined position of this loading chute the coal will of course also move forward.

While it is my intention to use this apparatus for conveying and loading any granular material such as stone, sand, grain or coal and in connection with any other equipment or apparatus, I shall for illustrative purposes preferably describe its application to the conveying and careful loading of coal. In the screening or grading of coal and in the handling of the larger coals, such as lump, it is desirable to load the lump coal into the railroad car with a minimum of breakage, and in some instances it may be desirable to remove the refuse, such as rock or slate, by hand picking, and to this end I have indicated in the illustrations a horizontally reciprocating picking table trough cooperating with the inclined loading chute.

With these and other objects in view my invention consists in the novel construction, combination and relative position of the parts and members hereinafter described and shown in the accompanying drawings, and particularly pointed out in the appended claims.

Referring to the drawing in which like reference characters indicate like or corresponding parts:

Fig. 1 is a side elevation of a conveying and loading apparatus embodying my invention and employing an inclined horizontally reciprocating receiving chute.

Fig. 2 is a plan view of same. Figure 3 is a cross section taken on line 3—3 of Fig. 2; and Fig. 4 is a cross section on line 4—4 of Fig. 2, illustrating the pivoted end of the support for the inclined loading chute.

Fig. 5 illustrates an elevation and part section taken between the pulley 52 and bearing 51 showing my invention employing a horizontally reciprocating picking table chute operating in connection with the inclined loading chute, and Fig. 6 is a plan view of same. Figures 7 and 8 show respectively, cross sections taken on line 7—7 and 8—8 of Fig. 6. Figure 9 is a cross section taken on line 9—9 of Fig. 5 showing a detail of the driving mechanism which imparts a reciprocating motion to the horizontal table whereby the material is progressively advanced or conveyed forwardly to the inclined loading chute. The inclined chute, however, being driven from a pair of oppositely mounted eccentrics receives a motion tending to reverse the flow of the material, but because of the inclined position of this chute the material will also be moved forward but with a retarding action which is rather desirable especially when the loading chute is at its maximum angle of inclination.

Figures 10 and 11 illustrate, respectively, side elevation and plan view of a slight modification of my invention wherein an inclined loading chute is employed to receive material from a curved angularly disposed chute which is arranged to feed the material to the loading chute.

Figures 12 and 13 are cross sections taken respectively on lines 12—12 and 13—13 of Fig. 11.

Referring particularly to Figures 1 to 4 inclusive, the coal in this instance is received by the slightly inclined receiving chute 20 from the right-angularly disposed chute or screen 21 which is formed at its discharge end to feed the coal in a uniform layer. The screen or chute 21 may be a movable screen or stationary chute or any other conveying means. The receiving chute 20 as here shown is formed with a bottom 20ª and sides 20ᵇ slightly converging toward the discharge end. The chute 20 has preferably angular rails 22 formed with horizontal treads to provide support and horizontal movement on the supporting rollers 23 during the lateral reciprocation of the chute. The chute 20 could also be supported on suitable long pendulum hangers and thus reciprocate in a substantially lateral plane with a very slight perpendicular movement which would be practically negligible.

The loading chute 24 is here preferably shown to comprise the bottom 24ª, parallel sides 24ᵇ with the flanged edges 24ᶜ. Two sets of supporting rollers 25 carried on the shafts 26 within the boxes 27 which are rigidly fixed to the bottom 24ª, support the loading chute 24 during its substantially horizontal reciprocatory movement on the tracks 28 and 28ª.

The tracks 28 and 28ª are rigidly fixed to the supporting frame 29 which includes the side members 29ª and cross members 29ᵇ.

The frame 29 is movably supported by means of attached side plates 30 which have pivotal support on the bolts 31 between the clip angles 32 rigid with the structure.

The drive for reciprocating the screens comprises a power driven pulley 33 which drives a suitably supported shaft 34 on which are mounted the two eccentrics 36 with connecting rods 37 having operative connection with the upper roller shaft 36 whereby the inclined chute 24 is reciprocated upon the substantially arcuate tracks 28 and 28ª. A similar eccentric 35, oppositely mounted on the shaft 34 for partial counteracting effect of the two chutes, is provided with a connecting rod 38 for reciprocation of the receiving chute 20.

From the illustrations, it will be obvious that the supporting frame 29 with the pivoted chute 24 can be raised or lowered about the pivotal bolts 31 by any suitable means here shown as a bail 40 having a flexible rope connection 41 which passes over the sheave 42. The free end of the connection 41 can be provided with a ring 39 as shown or with a counterweight or can be operatively connected to any hoisting mechanism.

The angle of inclination of chute 24 for loading and trimming positions may be made as desirable and will of course vary with the kind of material handled. The lowest position of the loading chute 24 should preferably be at such angle that the material will not be discharged over same by gravity when the chute is stationary, and the maximum raised position can be at the angle at which the material will be conveyed over chute during its reciprocation. Having determined the approximate maximum and minimum angles of inclination of the loading chute 24, the relative lateral positions of the rollers 25 and 26 can readily be determined to fix the length of the arcuate tracks or guides 28ª and 28. The curve of the track or guide 28ª will be made with a radius having its center on the center of the pivot pin or bolt 31, and for all practical purposes the track 28 will be of the same radius.

In the modification illustrated by Figs. 5 to 9, inclusive, the construction in general is similar to that of the arrangement described above except that in this case the receiving chute 43 is arranged horizontal and is adapted for use as a picking table. The coal can be readily hand-picked as it passes over this horizontally reciprocating trough. The drive mechanism for reciprocating both receiving and loading chutes is designed to impart a movement to the horizontal trough or chute 43 which is characterized by a progressively accelerated speed for the greater part of the forward stroke with a quick reverse and a progressively accelerated speed for the greater part of the return stroke. This particular mechanism is illustrated and described in Patent No. 1,386,505 issued to Richard S. Jacobsen August 2, 1921 entitled Means for operating reciprocating conveyors and screens, and comprises a pair of connecting rods 44 having operative connection at one end with the side of the loading chute at the roller shaft 26 and extend to the eccentrics 45 which are mounted on the non-uniformly rotating shaft 46 which imparts or transmits through the eccentrics 45 and their connecting rods, a motion which is characterized by progressive acceleration and retardation respectively for the greater part of each forward and backward stroke. Mounted on the shaft 46 and oppositely to the eccentrics 45 is an eccentric 47 and connecting rod 48 which has operative connection with the horizontal picking table chute 43 for imparting said variable motion in such manner that all material discharged on the horizontal picking table chute 43 will be conveyed forwardly during its reciprocation. Due to the relatively opposite mounting of the eccentrics 45 and 47, the inclined loading chute 24 will be operated with a reverse conveying motion but due to its angle of inclination such reverse conveying action will, of course, act only to convey the material forward, and a slight retarding action would only act to retard the flow of the material which would be particularly desirable at any steep inclination of the chute.

It will be observed that the shaft 46 is supported at one end by an ordinary bearing 49 and at the other end by a pair of special eccentric bearings 50 and 51 which support the shaft 46 eccentrically with relation to the center of the overhanging extensions 50^A and 51^A upon which are loosely mounted, the divided hub portions 52^A and 52^B of the power driven pulley 52. Centrally mounted with respect to the pulley 52 and bearings 50 and 51, (indicated in views 6 and 9) is the crank arm 53 which is keyed to the shaft and which has operative connection with the pulley 52 through the cast steel link 54 and connecting pins 55 and 56.

The two bearings 50 and 51 are oppositely disposed and axially aligned and spaced apart a distance to accommodate the crank arm 54 between them on the shaft, in the manner explained. The eccentrics 45 and 47 are each composed, as shown, of an eccentric cam on the shaft and a strap on each cam, so that each connecting rod is reciprocated positively in opposite directions by its allotted eccentric cam on the shaft. The horizontally disposed conveyor 43 and chute 24, as is well known, have what may be called a reverse motion conveying action, and are operated in this manner in a very positive and reliable way by the eccentrics on the shaft 46, which latter and the rotary driving member 52 are mounted, as shown and described, to rotate about parallel axes, with a connection from the rotary member to the shaft, so that the constant speed rotation of the pulley or rotary member is converted into a variable speed rotation on the part of said shaft. Shaft 46 is eccentrically mounted to rotate on the bearings 50 and 51, so that the axis of said shaft is fixed relatively to the parallel axis of the pulley, and the distance between these two axes will depend, of course, upon the exact character of the motion required for operating the conveyors.

It is obvious that any other type of mechanism similar to that above described can be used for operation of the picking table and loading chute.

In the modification illustrated by Figs. 10 to 13 inclusive, the receiving chute is omitted and the coal or other material is discharged directly upon the loading chute 24 from the end of a curved chute 57 which can be in one instance movable, as the curved end of a reciprocating screen, or it may be a stationary chute. The driving mechanism comprises a pair of eccentrics 58 and connecting rods 59 mounted on a shaft 60 operated by the power driven pulley 61.

I claim:

1. Means for conveying materials from a higher level to a lower, comprising a supporting frame pivotally mounted at its upper end, fixed guides on said frame, and a reciprocating loading chute having rollers mounted on said guides, said guides being formed with an arcuate tread for said rollers whereby said chute is reciprocated in a substantially horizontal plane.

2. Means for conveying materials from a higher level to a lower, comprising a supporting frame pivotally mounted at its upper end, a plurality of guides fixed on said frame, and a reciprocating loading chute having rollers mounted on said guides, the uppermost roller guides having an arcuate tread formed with a radius having its center concentric with the pivotal mounting of said frame.

3. The apparatus embodied in claim 1, and means for raising or lowering said supporting frame during the reciprocation of said chute.

4. The apparatus embodied in claim 1, in combination with an inclined reciprocating chute adapted to receive material and feed same to the loading chute on the frame, and oppositely disposed reciprocating mechanism for said chute arranged for partially counter-balancing the momentum of the two chutes.

5. The apparatus embodied in claim 1, in combination with an inclined horizontally reciprocating chute adapted to receive material and feed same to the loading chute on said frame, and driving mechanism arranged to partially counterbalance the momentum of the two chutes during their reciprocation.

6. The apparatus embodied in claim 2, in combination with an inclined reciprocating chute adapted to receive material and feed same to the loading chute on the frame, and oppositely disposed reciprocating mechanism for said chute arranged for partially counter-balancing the momentum of the two chutes, and means for raising or lowering the supporting frame with the loading chute during the reciprocation of the chutes.

7. The apparatus embodied in claim 2, in combination with an inclined horizontally reciprocating chute adapted to receive material and feed same to the loading chute on said frame, and driving mechanism arranged to partially counterbalance the momentum of the two chutes during their reciprocation, and means for raising or lowering the supporting frame with the loading chute during the reciprocation of the chutes.

8. The apparatus embodied in claim 1, in combination with a reciprocating horizontal trough or chute adapted to convey the material in a horizontal plane and feed same to the loading chute, and mechanism for reciprocating said chutes to convey the material thereon.

9. The apparatus embodied in claim 1, in combination with a reciprocating horizontal trough or chute adapted to convey the material in a horizontal plane to the loading chute, and oppositely disposed reciprocating mechanism for said chutes, arranged for partially counterbalancing the momentum of the two chutes.

10. The apparatus embodied in claim 1, in combination with a reciprocating horizontal trough or chute adapted to convey the material in a horizontal plane to the loading chute, and oppositely disposed reciprocating mechanism for said chutes. arranged for partially counterbalancing the momentum of the two chutes, said mechanism imparting reverse conveying actions to said chutes.

11. The apparatus embodied in claim 2, in combination with a reciprocating horizontal trough or chute adapted to convey the material in a horizontal plane and feed same to the loading chute, and mechanism for reciprocating said chutes to convey the material thereon, and means for raising or lowering the supporting frame with the loading chute during the reciprocation of both chutes.

12. The apparatus embodied in claim 2, in combination with a reciprocating horizontal trough or chute adapted to convey the material in a horizontal plane to the loading chute, and oppositely disposed reciprocating mechanism for said chutes, arranged for partially counterbalancing the momentum of the two chutes, and means for raising or lowering the supporting frame with the loading chute during the reciprocation of both chutes.

13. The apparatus embodied in claim 2, in combination with a reciprocating horizontal trough or chute adapted to convey the material in a horizontal plane to the loading chute, and oppositely disposed reciprocating mechanism for said chutes, arranged for partially counterbalancing the momentum of the two chutes, said mechanism imparting reverse conveying actions to said chutes, and means for raising or lowering the supporting frame with the loading chute during the reciprocation of both chutes.

14. Means for conveying materials from a higher level to a lower, comprising a supporting frame pivotally mounted near its upper end, fixed guides on said frame, and a reciprocating loading chute having rollers mounted on said guides, said guides affording a tread for said rollers and being so configured as to ensure a reciprocation of said chute in a substantially horizontal plane.

In witness whereof, I have hereunto subscribed my name this 16th day of December 1920.

FREDERICK A. KREHBIEL.